Fig. 1.

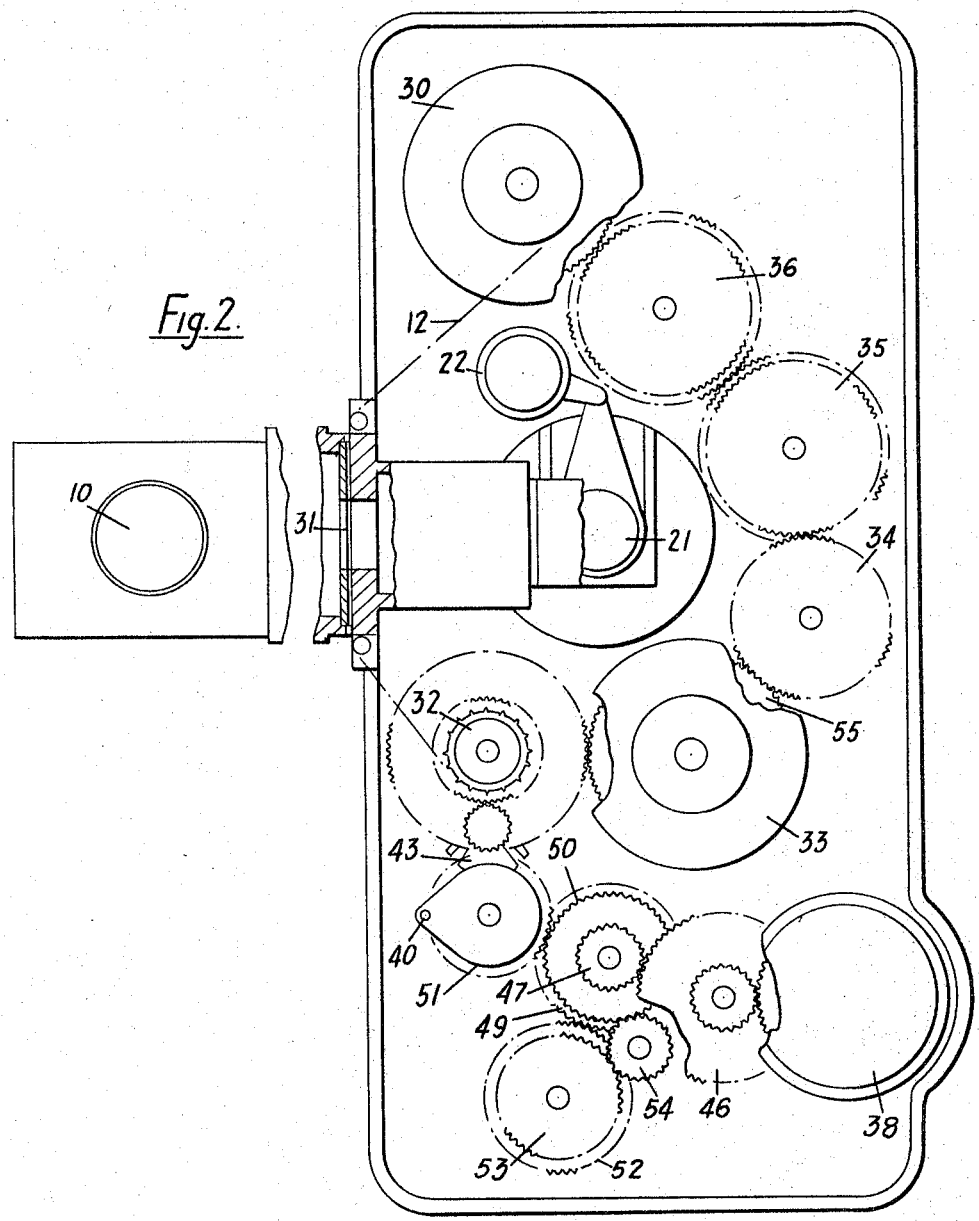

June 6, 1967　　D. S. RITCHIE　　3,323,413
APPARATUS FOR POSITIONING OR PRINTING NAMES IN
CARTOGRAPHIC PROCESSES
Filed June 4, 1964　　3 Sheets-Sheet 3
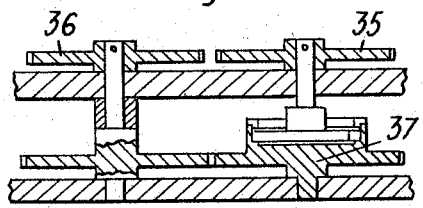
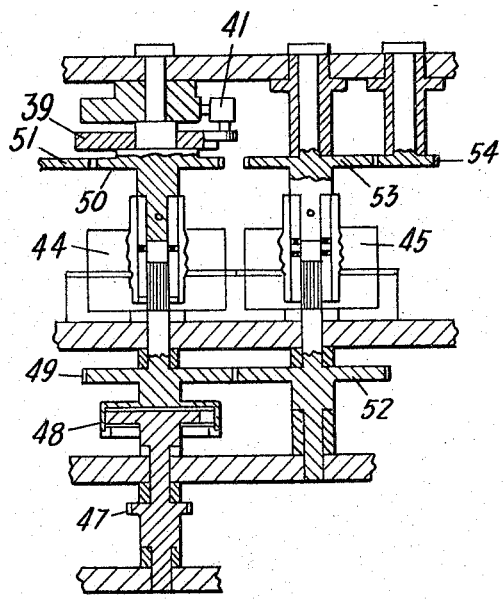
INVENTOR
DAVID SCARTH RITCHIE
BY Mason, Fenwick & Lawrence
ATTORNEYS 3,323,413
APPARATUS FOR POSITIONING OR PRINTING
NAMES IN CARTOGRAPHIC PROCESSES
David Scarth Ritchie, Anniesland, Glasgow, Scotland, assignor to Barr and Stroud Limited, Anniesland, Glasgow, Scotland, a British company
Filed June 4, 1964, Ser. No. 372,546
Claims priority, application Great Britain, June 6, 1963, 23,481/63
5 Claims. (Cl. 88—24)

This invention relates to apparatus for positioning or printing names in cartographic processes.

Up till now it has been necessary to hand print place names on maps and charts or alternatively to position by hand on the chart cut-out printed names. These processes are laborious and require a high degree of skill on the part of the people involved.

It is an object of the present invention to provide apparatus which speeds up the process and which may be automatically controlled in various aspects, if desired, from recorded material such as tape or punched cards.

The present invention is apparatus for positioning or printing names in cartographic processes, including a projector and a gantry system on which the projector is mounted to be movable in a co-ordinate system, said projector including a light source, a main projection system and a mechanism for controlling the movement of a film through the optical axis of the projection system, whereby names printed on the film may be projected onto and correctly located on a photosensitive sheet disposed beneath the apparatus.

Preferably the projection system includes a lens system which may be adjusted so that the distance from the object to the image remains constant with variation of magnification.

The gantry system may comprise a first carriage movable on rails and a second carriage movable on the first carriage at right angles thereto.

An embodiment of the invention will now be described, by way of example, with reference to the accompanying drawings, in which:

Figure 1:
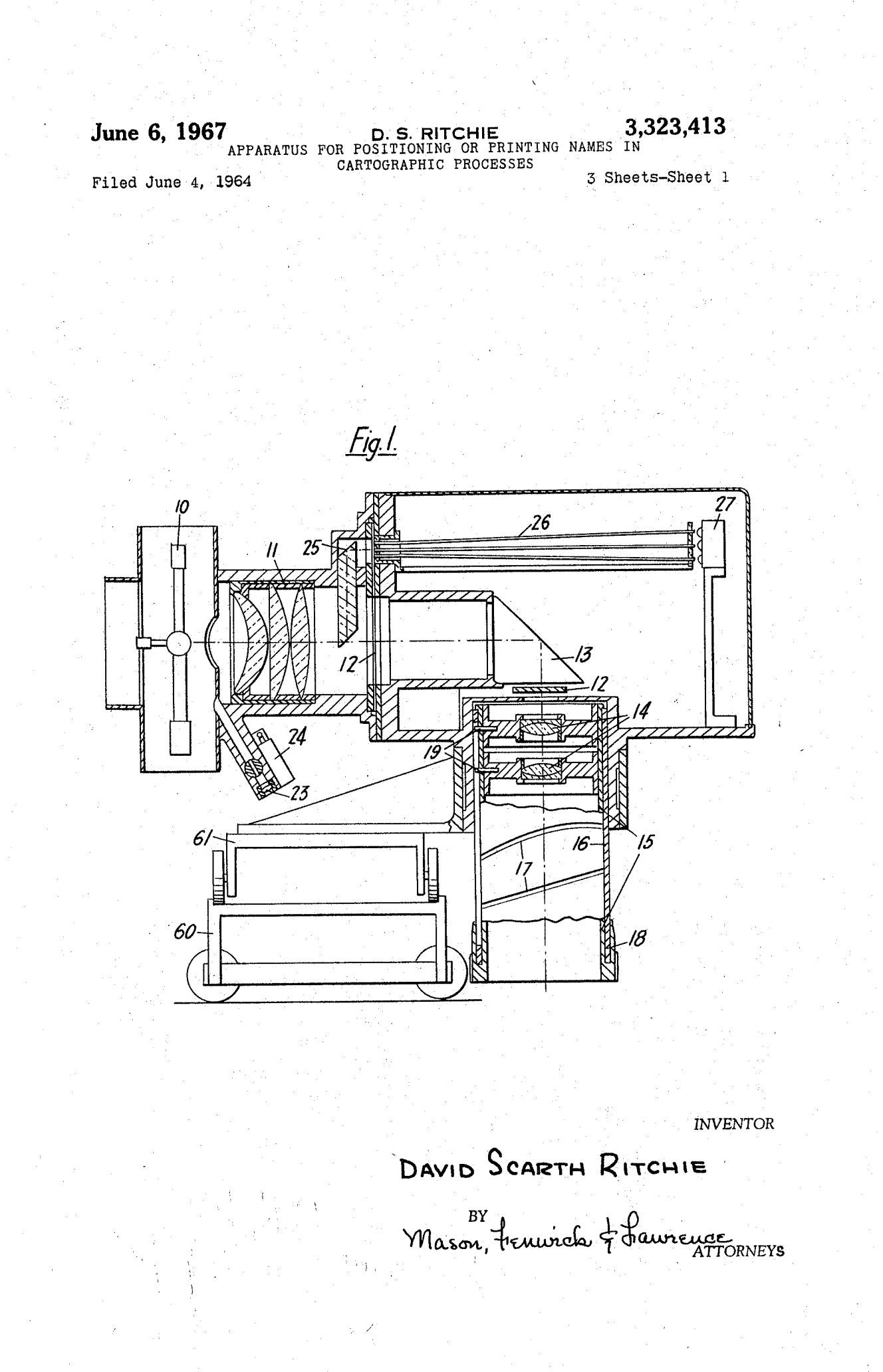

FIG. 1 is a sectional elevation of the embodiment;
FIG. 2 is an exposed plan view of the film control mechanism used in the embodiment of FIG. 1; and
FIGS. 3 and 4 are elevations of details of the mechanism shown in FIG. 2.

Referring now to the drawings, apparatus according to the invention for positioning or printing names in a cartographic process consists of a projector comprising a main projection system, an auxliiary projection system, identification means and a film control mechanism, and a gantry system on which the projector is mounted so as to be capable of moving in coordinates, such as $x$ and $y$ Cartesian co-ordinates, over a photosensitive sheet on which the names are to be disposed as on the map.

The main projection system, seen in FIG. 1, consists of a lamp 10 which provides a point source of high intensity and actinic efficiency, a lens combination 11 which condenses the light from the lamp 10 to flood the area of a film 12 containing the name to be printed, a prism 13 and a lens system 14 of variable power for projecting the name onto the image plane, e.g. the surface of the photosensitive sheet.

The two component lenses forming the system 14 may move in such a way that a variation in magnification is produced while maintaining focus of the image in the same plane. An operating head 15 is attached to a cylindrical sleeve 16 which contains two helical slots 17 and which rotates in a bearing 18. Cams in the form of pins 19 on the lens holders 20 project through the slots 17 and engage a longitudinal slot (not shown) in the bearing 18.

The effect of rotating the cylindrical sleeve is to cause the lenses to move axially without rotation and in such a way that their separation is governed by the separation of the slots 17, thus producing a lens system of variable power but with a constant sum of its working conjugate object and image distances, i.e. a "zoom" lens system.

The main projection system also includes a safe light shutter 21 operable by a solenoid 22 (FIG. 2). The shutter 21, which may consist of red-tinted glass, may be translated in and out of the light beam entering the lens system 14 so as to produce either safe light viewing of the image for positioning purposes or printing of the image.

The auxiliary projection system, used in locating the image projected by the main projection system, consists of a small projector lens 23 forming a direct image of the lamp 10 at the centre of the focal plane of the main projection system. A small solenoid 24 is provided to control the operation of a shutter (not shown) adjacent the lens 23.

The identification means includes a small prism 25 which picks up some of the light from the lens combination 11 and illuminates an area of the film 12 containing a coded identification of the name being projected. The code may be in the form of clear dots on the film which allow light to pass which is then caused to fall by a series of light pipes or fibres 26 onto a battery of small photocells 27. The coded identification may then be compared with a similar signal associated with stored data giving the recorded position of the name being projected. By this means, servo-motors driving the gantry system may be actuated to position the apparatus correctly. If desired, however, manual positioning of the apparatus may be employed.

The light pipes or fibres 26 may be replaced by a lens.

The names on the film are in the form of clear lettering on a dark background and movement of the film through the light beam from the source 10 is controlled by the control mechanism shown in FIGS. 2, 3 and 4. The film is in the form of a long roll and is initially on a take-off spool 30 from which it is fed through a film gate 31 across the optical axis of the main projector system and onto a driving spool 32. From there it is fed on to a take-up spool 33 which is driven off the driving spool 32, but with provision for slip so that the amount of drive to the film is governed by the constant radius of the driving spool 32, not by the variable radius of the take-up spool 33. The gear 55 which drives the take-up spool 33 in turn drives a series of gears 34, 35 and 36. These are used for purposes of providing a reversal of drive to the film when required, i.e. when the direction of drive to the driving spool 32 is reversed it is necesary to cause the spool 30 to act as a take-up spool. The spool 30 is thus caused to rotate, in the appropriate direction to act as a take-up spool, by the gear 36, but only when the direction of drive is reversed. This is achieved by including on the same spindle as gear 35 a silent ratchet or auto-lock device 37 which only drives in one direction so that the motion is only passed on to the gear assembly 36 when the driving spool is reversed.

The drive to the film originates from a solenoid 38 which imparts a rotary motion to a gear train causing a cam 39 to ride over top-dead-centre and to perform one revolution for each actuation of the solenoid 38. The cam 39 is re-registered after each revolution by a spring loaded plunger 41 engaging in a notch. The revolution of the cam 39 is converted into a precise angular feed to the film by means of a device 43 of the well known maltese cross type, a driving pin 40 engaging in the slots in the maltese cross 43 so that it is rotated by a precise fraction of a revolution for each approximate revolution of the cam 39. The rotary movement of the maltese cross 43 is conveyed to the driving spool 32.

In order to produce a reversal of the drive to the spool using the same movements of the actuating solenoid 38 it is arranged that there are two magnetic clutches 44 and 45 arranged mechanically in parallel as seen in FIG. 4. For forward drive the clutch 44 is closed and the clutch 45 opened, while for reverse drive both clutches are changed over. The drive from the solenoid 38 passes through a gear pair 46 to the gear 47. This gear drives through a silent ratchet one way drive 48 the gear 49 and in turn through the clutch 44 on the same shaft the gear 50, the latter providing the onward drive to the cam 39 with the spring loaded plunger 41 locating in a notch. Thus the gears 50 and 51 which mesh are caused to turn through approximately 1 revolution. For the reverse drive the clutch 45 on the same shaft as gears 52 and 53 is closed so that the gear 50 is driven in the reverse direction through an idler 54.

The gantry system consists of a first carriage 50 movable on rails above the map or chart and a second carriage 61 movable at right angles on the carriage 60. The two carriages thus form a co-ordinate system and their movements, as indicated hereinbefore, may be controlled either automatically or manually. The projector is pivotally mounted about a vertical axis on a bracket secured to the carriage 61.

The method of placing the names on the photosensitive sheet can vary somewhat. In all cases it is necessary to project the names individually onto a sheet containing the map detail, other than names, in order to decide the appropriate position for each name in relation to the spot representing its position and other surrounding detail. The co-ordinates of the position chosen for the name can then be recorded, automatically or otherwise, so that the gantry can subsequently be returned to the same position for photographic recording of the name on the photosensitive sheet in a later operation when the latter is substituted for the map detail sheet. Alternatively, means can be provided for carrying the map detail sheet on a moving surface immediately above the photosensitive sheet so that it can be temporarily moved away during the photographic recording process and subsequently accurately re-registered. The map sheet may be of light sensitive self-developing material such as printing-out paper which can be used to form a graphic record of the name in its selected position.

The term "printing" used hereinbefore is intended to embrace the various forms of marking resulting from the projection of light onto photosensitive material.

I claim:

1. Apparatus for positioning or printing names in cartographic processes, including a projector and a gantry system on which the projector is mounted to be movable in a coordinate system, said projector including a light source, a main projection system and means for moving a film in either direction through the optical axis so that names printed on the film may be accurately registered in relation to the optical axis of the main projection system and may be projected onto a photosensitive sheet disposed beneath the apparatus, the main projection system including a lens system of which the focal length is automatically controlled by cams mounted on the lens holders and cooperating with helical slots in a rotatable sleeve so that the distance from object to image remains constant with variation of magnification, and means for inserting a safe light filter in the main projection system for trial viewing of the projected image.

2. Apparatus as claimed in claim 1, in which the gantry system comprises a first carriage movable on rails and a second carriage movable on the first carriage at right angles to the rails.

3. Apparatus as claimed in claim 1, including identification means for automatically reading a coded identification of each name on the film to ensure that the name is projected in accordance with recorded position data appropriate to it.

4. Apparatus as claimed in claim 3, in which servo motors are provided to operate the gantry system automatically in accordance with signals received from the recorded data.

5. Apparatus as claimed in claim 1, including an auxiliary projection system for locating the image projected by the main projection system.

References Cited

UNITED STATES PATENTS

| | | | |
|---|---|---|---|
| 3,116,661 | 1/1964 | Holland et al. | 88—24 |
| 3,183,770 | 5/1965 | Nyman et al. | 88—24 |

NORTON ANSHER, *Primary Examiner.*

R. WINTERCORN, *Assistant Examiner.*